United States Patent
Kodaira

(10) Patent No.: US 9,030,727 B2
(45) Date of Patent: May 12, 2015

(54) ELECTROWETTING DISPLAY APPARATUS AND METHOD OF MANUFACTURING THE SAME

(75) Inventor: Taimei Kodaira, Hwaseong-si (KR)

(73) Assignee: Amazon Technologies, Inc., Reno, NV (US)

( * ) Notice: Subject to any disclaimer, the term of this patent is extended or adjusted under 35 U.S.C. 154(b) by 84 days.

(21) Appl. No.: 13/569,801

(22) Filed: Aug. 8, 2012

(65) Prior Publication Data

US 2013/0242371 A1    Sep. 19, 2013

(30) Foreign Application Priority Data

Mar. 16, 2012 (KR) ........................ 10-2012-0027357

(51) Int. Cl.
| | | |
|---|---|---|
| *G02B 26/00* | (2006.01) | |
| *G02B 26/08* | (2006.01) | |
| *G02F 1/29* | (2006.01) | |
| *G02F 1/167* | (2006.01) | |

(52) U.S. Cl.
CPC .............. *G02F 1/167* (2013.01); *G02B 26/005* (2013.01)

(58) Field of Classification Search
CPC ............... G02B 26/005; G02B 26/004; G02B 2207/115; G02B 26/02; G02B 27/2242; G02B 3/14; G02B 1/06; G02B 26/00; G02B 5/24; G02B 6/0031; G02B 6/0036; G02B 6/055; G02B 6/0058; G02B 6/0068; G02B 6/007
USPC ......... 359/237, 242, 290–292, 295, 298, 246, 359/247, 252–254, 267–272, 296
See application file for complete search history.

(56) References Cited

U.S. PATENT DOCUMENTS

| | | | |
|---|---|---|---|
| 5,739,882 | A | 4/1998 | Shimizu et al. |
| 5,861,932 | A | 1/1999 | Inata et al. |
| 7,646,358 | B2 * | 1/2010 | Hattori et al. ................. 345/31 |
| 7,821,699 | B1 | 10/2010 | Lo et al. |
| 8,514,479 | B2 * | 8/2013 | Bae et al. ..................... 359/290 |
| 2008/0157660 | A1 * | 7/2008 | Ohyama et al. ............... 313/504 |
| 2009/0078458 | A1 * | 3/2009 | Araumi ........................ 174/262 |
| 2010/0300862 | A1 | 12/2010 | Tamura et al. |

FOREIGN PATENT DOCUMENTS

| | | | | |
|---|---|---|---|---|
| EP | 1743212 | 10/2005 | | |
| JP | 06059228 | 3/1994 | | |
| JP | 2004163459 | 6/2004 | | |
| JP | 2009075284 | 4/2009 | | |
| JP | 2010210769 | 9/2010 | | |
| JP | 4599903 | 12/2010 | | |
| JP | 2011-107635 | * 6/2011 | ............ | G03G 15/02 |
| KR | 100486491 | 7/1999 | | |
| WO | 2005098524 | 10/2005 | | |

* cited by examiner

*Primary Examiner* — Scott J Sugarman
*Assistant Examiner* — Brandi Thomas
(74) *Attorney, Agent, or Firm* — Lee & Hayes, PLLC

(57) ABSTRACT

A manufacturing method of an electrowetting display apparatus, in which a pixel electrode is formed on a substrate including pixel areas, a first mixture including a hydrophobic material and a solvent is disposed on the substrate to form a hydrophobic insulating layer, and a first heat process is performed to remove a portion of the solvent. Then, a second mixture including a material for a barrier and the solvent is disposed on the hydrophobic insulating layer, and the second mixture is patterned to form a barrier wall surrounding the pixel electrode in each pixel area. A second heat process is performed to remove the solvent in the hydrophobic insulating layer and the barrier wall, and a polar fluid and a non-polar fluid are disposed on the pixel electrode to form an electrowetting layer.

20 Claims, 7 Drawing Sheets

ELECTROWETTING DISPLAY APPARATUS AND METHOD OF MANUFACTURING THE SAME

CROSS-REFERENCE TO RELATED APPLICATION

This application claims priority from and the benefit of Korean Patent Application No. 10-2012-0027357, filed on Mar. 16, 2012, which is hereby incorporated by reference for all purposes as if fully set forth herein.

BACKGROUND

1. Field

Exemplary embodiments of the present invention relate to an electrowetting display apparatus and a method of manufacturing the same. More particularly, exemplary embodiments of the present invention relates to an electrowetting display apparatus capable of improving adhesive force between a hydrophobic insulating layer and a barrier wall and a is method of manufacturing the electrowetting display apparatus.

2. Discussion of the Background

An electrowetting display apparatus, which is spotlighted as a next generation display apparatus, has improved display properties as compared with previous generation display apparatuses, such as fast response speed, low driving voltage, reduced thickness, etc.

The electrowetting display apparatus includes a hydrophobic insulating layer, a barrier wall disposed on the hydrophobic insulating layer, and a polar fluid in areas partitioned by the barrier wall. The electrowetting display apparatus applies a source voltage to move the polar fluid, thereby displaying desired images.

Because the hydrophobic insulating layer and the barrier wall are separately formed, the barrier wall moves when the adhesive force between the hydrophobic insulating layer and the barrier wall is weak. As a result, the hydrophobic property of the hydrophobic insulating layer may be damaged at the boundary between the hydrophobic insulating layer and the barrier wall.

SUMMARY

Exemplary embodiments of the present invention provide an electrowetting display apparatus capable of improving adhesive force between a hydrophobic insulating layer and a barrier wall.

Exemplary embodiments of the present invention also provide a method of manufacturing the electrowetting display apparatus.

Additional features of the invention will be set forth in the description which follows, and in part will be apparent from the description, or may be learned by practice of the invention.

An exemplary embodiment of the present invention discloses an electrowetting is display apparatus including an array substrate, an opposite substrate, an electrowetting layer, and a barrier wall. The array substrate includes a base substrate including a plurality of pixel areas, a plurality of pixel electrodes spaced apart from each other and respectively disposed in the pixel areas, and a hydrophobic insulating layer disposed on the pixel electrodes. The opposite substrate includes a common electrode to face the array substrate. The electrowetting layer is disposed between the array substrate and the opposite substrate and includes a polar fluid and a non-polar fluid. The barrier wall is disposed between the pixel areas and on the hydrophobic insulating layer. The barrier wall includes a photosensitive resin and an additive.

An exemplary embodiment of the present invention also discloses a method of manufacturing an electrowetting display apparatus, in which a pixel electrode is formed on a substrate including a plurality of pixel areas, and the pixel electrode is formed in each pixel area. Then, a first mixture including a hydrophobic material and a solvent dissolving the hydrophobic material is coated on the substrate to form a hydrophobic insulating layer. A first heat process is performed on the hydrophobic insulating layer to remove a portion of the solvent. A second mixture including a material for a barrier wall and the solvent is coated on the hydrophobic insulating layer, and the second mixture is patterned to form the barrier wall that surrounds the pixel electrodes in each pixel area. Then, a second heat process is performed to remove the solvent in the hydrophobic insulating layer and the barrier wall, and a polar fluid and a non-polar fluid are disposed on the pixel electrode to form an electrowetting layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
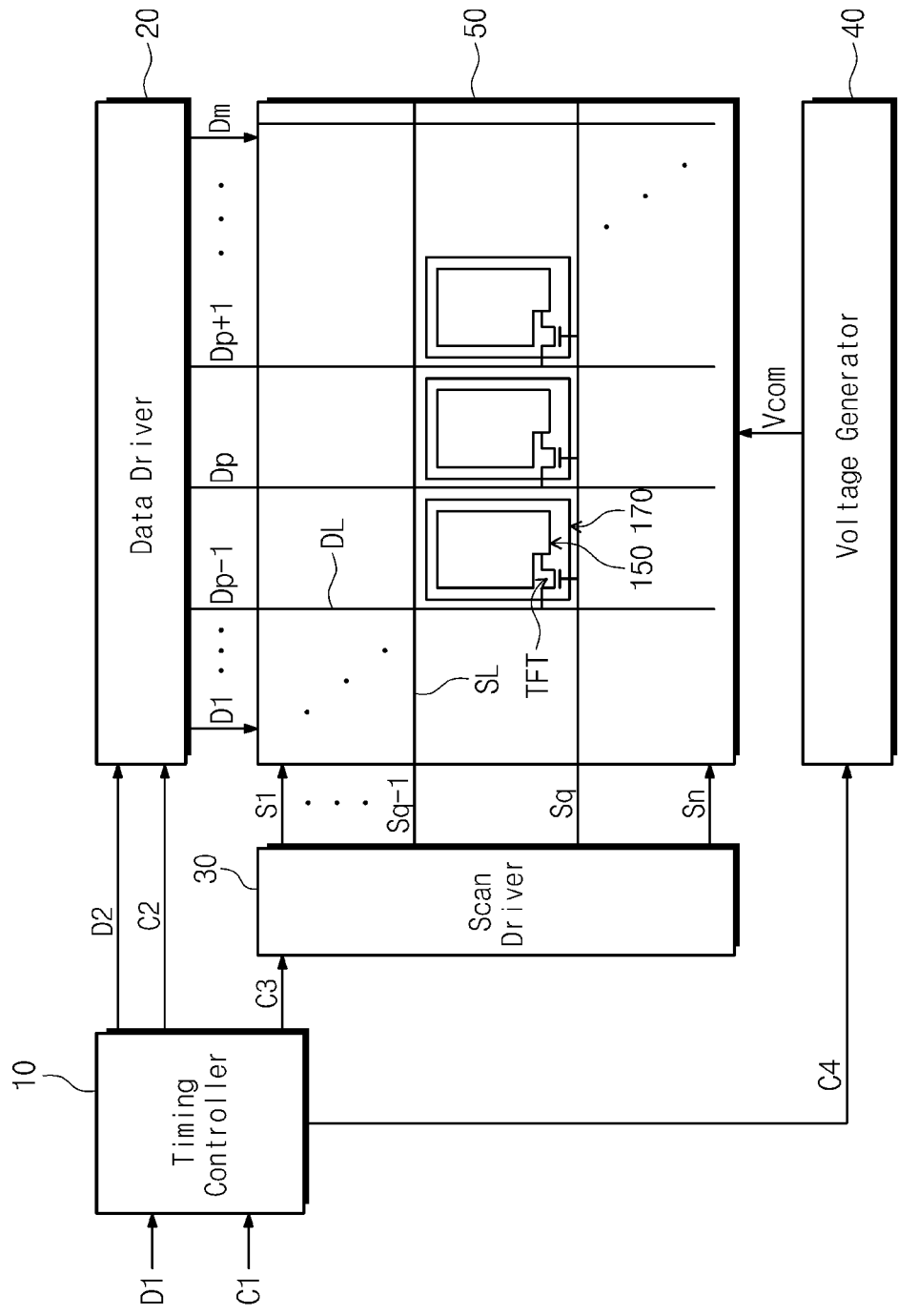
FIG. 1 is a block diagram showing an electrowetting display apparatus according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. It will be understood that for purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a block diagram showing an electrowetting display apparatus according to an exemplary embodiment of the present invention.

Referring to FIG. 1, an electrowetting display apparatus includes a timing controller 10, a data driver 20, a scan driver 30, a voltage generator 40, and an electrowetting display panel 50. The timing controller 10, the data driver 20, the scan driver 30, and the voltage generator 40 are used to drive the electrowetting display panel 50.

The timing controller 10 receives a first data D1 and a first control signal C1 from is an external source device (not shown), such as a graphic controller, and provides a second data D2 and a second control signal C2 to the data driver 20.

In addition, the timing controller 10 provides a third control signal C3 to the scan driver 30 and a fourth control signal C4 to the voltage generator 40. For instance, the first control signal C1 includes a vertical synchronization signal, a horizontal synchronization, a data enable signal, and a main clock. The second control signal C2 includes a load signal and a horizontal start signal.

The data driver 20 converts the second data D2 provided from the timing controller 10 to data signals, e.g., data voltages, and provides the converted data signals D1, . . . , Dp−1, Dp, Dp+1, . . . , Dm to the electrowetting display panel 50.

The scan driver 30 sequentially applies gate-on voltages S1, . . . , Sq−1, Sq, . . . , Sn to the electrowetting display panel 50 in response to the third control signal C3.

The voltage generator 40 applies a common voltage Vcom to the electrowetting display panel 50 in response to the fourth control signal C4. Although not shown in FIG. 1, the voltage generator 40 generates various voltages required by the timing controller 10, the data driver 20, and the scan driver 30.

The electrowetting display panel 50 includes m data lines DL (e.g., source lines) to transmit data voltages and n scan lines SL (e.g., gate lines) to transmit the gate-on signal.

The electrowetting display panel 50 includes pixel areas positioned adjacent to crossing points of the data lines DL and the scan lines SL. Each pixel area includes a thin film transistor TFT, a pixel electrode 150, and a barrier wall 170. The thin film transistor TFT includes a gate electrode electrically connected to a corresponding scan line of the scan lines SL and a source electrode electrically connected to a corresponding data line of the data lines DL.

The pixel electrode 150 is electrically connected to a drain electrode of the thin is film transistor TFT. The barrier wall 170 surrounds the pixel electrode 150 to provide a predetermined space therebetween. A conductive tinted liquid is accommodated in the space. The conductive tinted liquid is scattered or collected together in response to an electric field difference between the pixel electrode 150, disposed at a relatively lower portion, and a common electrode (not shown), disposed at a relatively upper portion, to display an image. The common electrode is applied with the common voltage Vcom.

Figure 2:
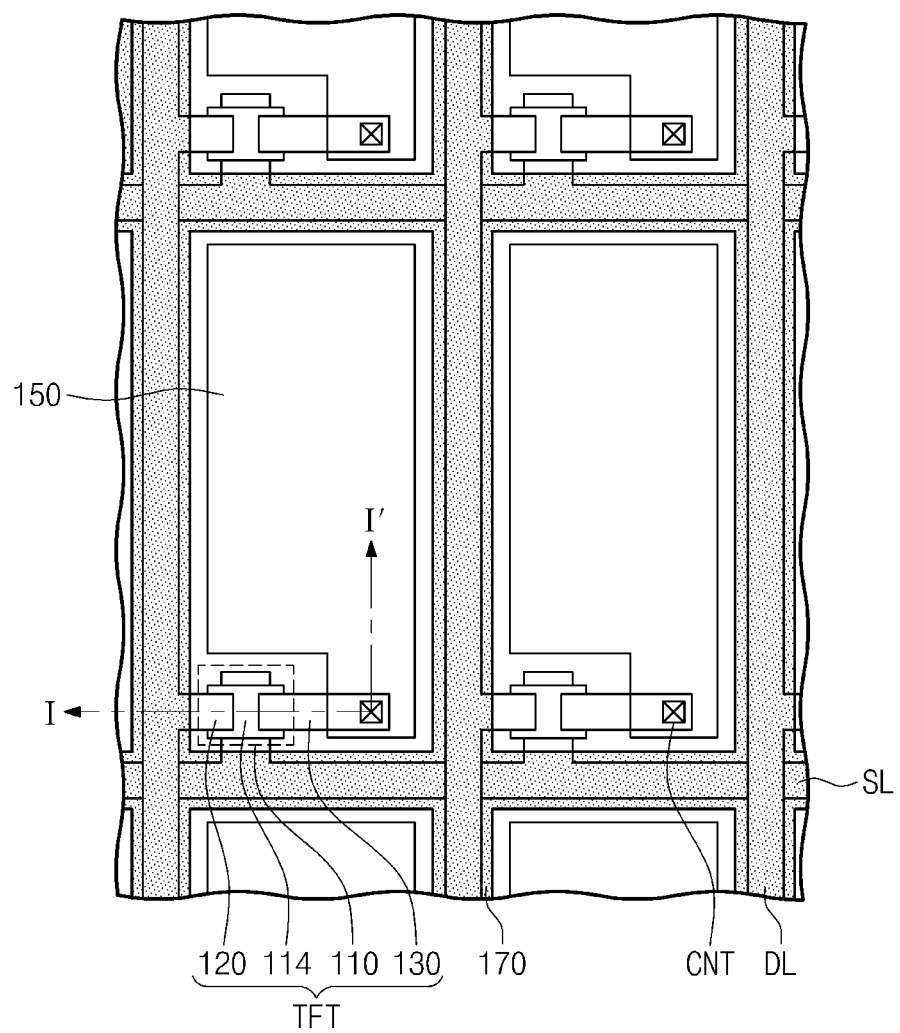
FIG. 2 is a plan view showing a pixel of an electrowetting display apparatus shown in FIG. 1.
Figure 3:
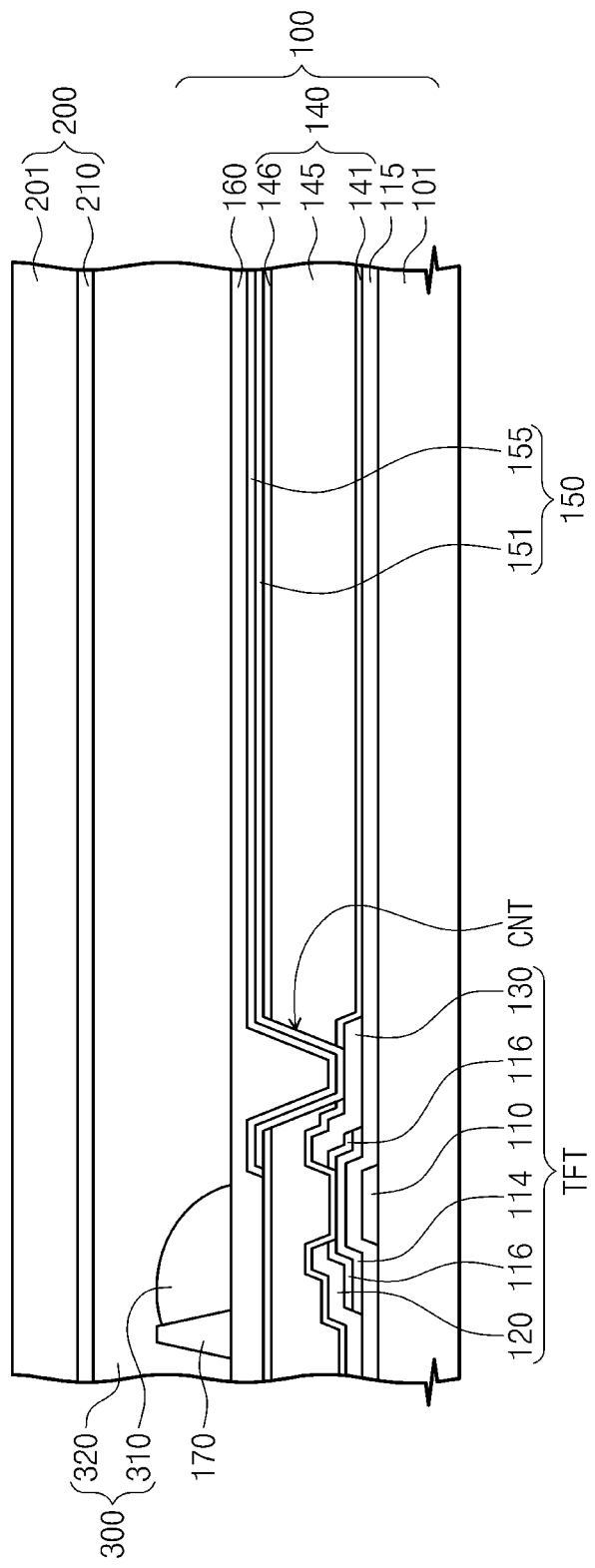
FIG. 3 is a cross-sectional view showing a pixel shown in FIG. 1.

FIG. 2 is a plan view showing a pixel of an electrowetting display apparatus shown in FIG. 1, and FIG. 3 is a cross-sectional view showing a pixel shown in FIG. 1.

Referring to FIGS. 2 and 3, the electrowetting display panel 50 includes an array substrate 100, an opposite substrate 200 facing the array substrate 100, and an electrowetting layer 300 disposed between the array substrate 100 and the opposite substrate 200.

The array substrate 100 includes the pixel areas. Each pixel area includes the thin film transistor TFT and the pixel electrode 150 electrically connected to the thin film transistor TFT.

In detail, the array substrate 100 includes a first base substrate 101. The scan line SL is disposed on the first base substrate 101 in a first direction, e.g., a horizontal direction, and the gate electrode 110 protrudes from the scan line SL. The first base substrate 101 may be a rigid type substrate, such as a glass substrate, a quartz substrate, a glass ceramic substrate, a crystalline glass substrate, etc., or a flexible type substrate, such as a film, a plastic, etc. The first base substrate 101 may be formed of a material having sufficient heat-resistance to a high temperature process when the first base substrate 101 is formed.

A gate insulating layer 115 is disposed on the first base substrate 101 to cover the gate electrode 110 and the scan line SL, and a semiconductor layer 114 is disposed on the gate is insulating layer 115 to correspond to the gate electrode 110.

The data line DL extended in a second direction, e.g., a vertical direction, the source electrode 120 protruded from the data line DL to cover a portion of the semiconductor layer 114, and the drain electrode 130 spaced apart from the source electrode 120 to cover a different portion of the semiconductor layer 114 are disposed on the gate insulating layer 115 and the semiconductor layer 114. The gate electrode 110, the semiconductor layer 114, the source electrode 120, and the drain electrode 130 form the thin film transistor TFT.

An ohmic contact layer 116 is disposed between the semiconductor layer 114 and the source electrode 120, and between the semiconductor layer 114 and the drain electrode 130.

A protective layer 140 is disposed on the thin film transistor TFT and the gate insulating layer 115. The protective layer 140 is provided with a contact hole CNT formed therethrough to expose a portion of the drain electrode 130. In addition, the protective layer 140 may have a multi-layer structure. For instance, the protective layer 140 may include a first protective layer 141 that covers the thin film transistor TFT and the gate insulating layer 115 and including an inorganic material, a second protective layer 145 disposed on the first protective layer 141 and including an organic material, and a third protective layer 146 disposed on the second protective layer 145 and including an inorganic material.

The pixel electrode 150 is disposed on the protective layer 140 and electrically connected to the drain electrode 130 through the contact hole CNT of the protective layer 140.

The pixel electrode 150 may have a multi-conductive layer structure. For example, the pixel electrode 150 may include a first conductive layer 151 making contact with the drain electrode 130 and a second conductive layer 152 disposed on the first conductive layer 151. In the present exemplary embodiment, one of the first conductive layer 151 and the second is conductive layer 152 includes a transparent conductive material, such as indium tin oxide, indium zinc oxide, etc., and the other one of the first conductive layer 151 and the second conductive layer 152 includes a conductive metal material to reflect light.

A hydrophobic insulating layer 160 is disposed on the pixel electrode 150 and the protective layer 140. The hydrophobic insulating layer 160 may include a transparent material having a hydrophobic property or a surface modified to have a hydrophobic property. The hydrophobic insulating layer 160 includes at least one hydrophobic organic resin including at least one of a fluoropolymer, a poly(p-xylylene)polymer, a polypropylene-based resin, and a siloxane-based resin, and at least one hydrophobic inorganic particle including at least one of $SiO_2$, $Al_2O_3$, ZnO, $TiO_2$, and BST (Barium Strontium Titanate).

The barrier wall 170 is disposed on the hydrophobic insulating layer 160 between the pixel areas. The barrier wall 170 has a closed loop shape to surround each pixel area. In addition, the barrier wall 170 is overlapped with the scan lines SL and the data lines DL because the scan lines SL and the data lines DL are disposed between the pixel areas. In addition, the barrier wall 170 may serve as a spacer to maintain a minimum distance between the array substrate 100 and the opposite substrate 200.

As shown in the present exemplary embodiment, the pixel areas are surrounded by the scan lines SL and the data lines DL, but other configurations are possible. For example, the scan lines SL and the data lines DL may be arranged to pass through the pixel areas.

The opposite substrate 200 is coupled to the array substrate 100 to face the array substrate 100. The opposite substrate 200 includes a second base substrate 201 and the common electrode 210 disposed on the second base substrate. The common electrode 210 is applied with the common voltage Vcom.

The electrowetting layer 300 includes a first fluid 310 and a second fluid 320 having specific gravities which differ from each other. Thus, the first fluid 310 and the second fluid 320 are not mixed with each other and are separated from each other by a boundary therebetween. In the present exemplary embodiment, the first fluid 310 may have a specific gravity greater than that of the second fluid 320.

In addition, one of the first fluid 310 and the second fluid 320 is a polar fluid and the other one of the first fluid 310 and the second fluid 320 is a non-polar fluid. In detail, the first fluid 310 may be non-polar and the second fluid 320 may be polar. In this case, the first fluid 310 may be oil including a black dye or a light absorbing material serving as a light shutter that blocks or transmits the light. The first fluid 310 is accommodated in each pixel area surrounded by the barrier wall 170. The second fluid 320 may be water or an aqueous solution. The second fluid 320 is accommodated in each pixel area or covers the pixel areas.

The electrowetting display panel 50 controls the movement of the first and second fluids 310 and 320 in response to the electric potential difference between the data voltage applied to the pixel electrode 150 and the common voltage Vcom applied to the common electrode 210 so as to display desired images.

Hereinafter, a method of manufacturing the electrowetting display apparatus will be described in detail with reference to FIGS. 2 to 7.

FIGS. 4 to 7 are process cross-sectional views showing a method of manufacturing an electrowetting display apparatus according to an exemplary embodiment. FIGS. 4 to 7 show the pixel electrode, the hydrophobic insulating layer on the pixel electrode, and the barrier wall on the pixel electrode.

Figure 4:
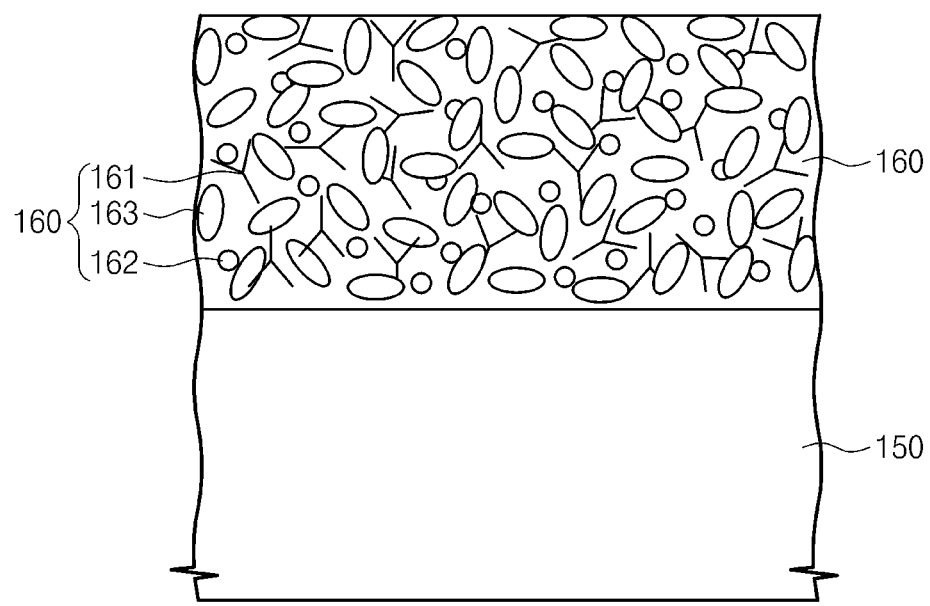
FIG. 4, FIG. 5, FIG. 6, and FIG. 7 are process cross-sectional views showing a method of manufacturing an electrowetting display apparatus according to a second exemplary embodiment of the present invention.

Referring to FIGS. 2 to 4, the scan line SL, the data line DL, the thin film is transistor TFT connected to the scan line SL and the data line DL, and the pixel electrode 150 are formed on the first base substrate 101.

In detail, the scan line SL and the gate electrode 110 protruded from the scan line SL are formed on the first base substrate 101. The first base substrate 101 includes the pixel areas arranged in a matrix form, and the scan line SL is disposed substantially parallel to a row direction or a column direction of the matrix form. In addition, the gate electrode 110 protrudes from the scan line SL to an inner portion of each pixel area.

Although not shown in figures, a buffer layer (not shown) formed of an insulating material may be formed between the first base substrate 101 and the scan line SL, and between the base substrate 101 and the gate electrode 110, in order to prevent foreign substances from infiltrating to the thin film transistor TFT.

After forming the scan line SL and the gate electrode 110, the gate insulating layer 115 is formed to cover the scan line SL and the gate electrode 110.

Then, the semiconductor layer 114 is formed in each pixel area to cover at least the gate electrode 110.

After that, a conductive material is deposited on the semiconductor layer 114 and patterned to form the ohmic contact layer 116, and thus the portion of the semiconductor layer 114, which overlaps the gate electrode 110, is exposed through the ohmic contact layer 116, and the ohmic contact layer 116 is provided in two portions on both ends of the semiconductor layer 114.

When the ohmic contact layer 116 is formed, the data line DL crossing the scan line SL, the source electrode 120 protruding from the data line DL to make contact with one portion of the ohmic contact layer 116, and the drain electrode 130 making contact with the other is portion of the ohmic contact layer 116, are formed. Accordingly, the thin film transistor TFT is defined by the gate electrode 110, the semiconductor layer 114, the source electrode 120, and the drain electrode 130.

After the data line DL, the source electrode 120, and the drain electrode 130 are formed, the protective layer 140 is formed to cover the thin film transistor TFT and the gate insulating layer 115.

The protective layer 140 may have a multi-layer structure. For instance, the protective layer 140 may include a first protective layer 141 that covers the thin film transistor TFT and the gate insulating layer 115 and including an inorganic material, a second protective layer 145 disposed on the first protective layer 141 and including an organic material, and a third protective layer 146 disposed on the second protective layer 145 and including an inorganic material. The second protective layer 145 compensates for a step difference between lower layers to improve a step coverage.

Then, a portion of the protective layer 140 is removed to form the contact hole CNT through which the portion of the drain electrode 130 is exposed.

The pixel electrode 150 is formed in each pixel area to be electrically connected to the drain electrode 130. As shown in FIG. 3, the pixel electrode 150 may have a multi-conductive layer structure. For instance, the pixel electrode 150 may be formed by forming the first conductive layer 151 making contact with the drain electrode 130 and forming the second conductive layer 152 on the first conductive layer 151.

After the pixel electrode 150 is formed, a first mixture including the hydrophobic material and solvent 163 dissolving the hydrophobic material is coated on the pixel electrode 150 to form the hydrophobic insulating layer 160 as shown in FIG. 4. The surface of the is hydrophobic insulating layer 160 has a hydrophobic property. In addition, the hydrophobic insulating layer 160 may be formed using various methods, such as a spin coating method, a dipping method, a spray coating method, an inkjet printing method, etc.

The hydrophobic material includes at least one hydrophobic organic resin 161 including at least one of a fluoropolymer, a poly(p-xylylene)polymer, a polypropylene-based resin, and a siloxane-based resin, and at least one hydrophobic inorganic particle 162 including at least one of $SiO_2$, $Al_2O_3$, ZnO, $TiO_2$, and BST (Barium Strontium Titanate).

The solvent 163 may be an organic solution which is able to dissolve the hydrophobic material. In particular, the solvent 163 may be solution capable of dissolving the hydrophobic organic resin. For instance, if the hydrophobic organic resin is a fluoropolymer, the solution may be perflourinated solvent.

Figure 5:
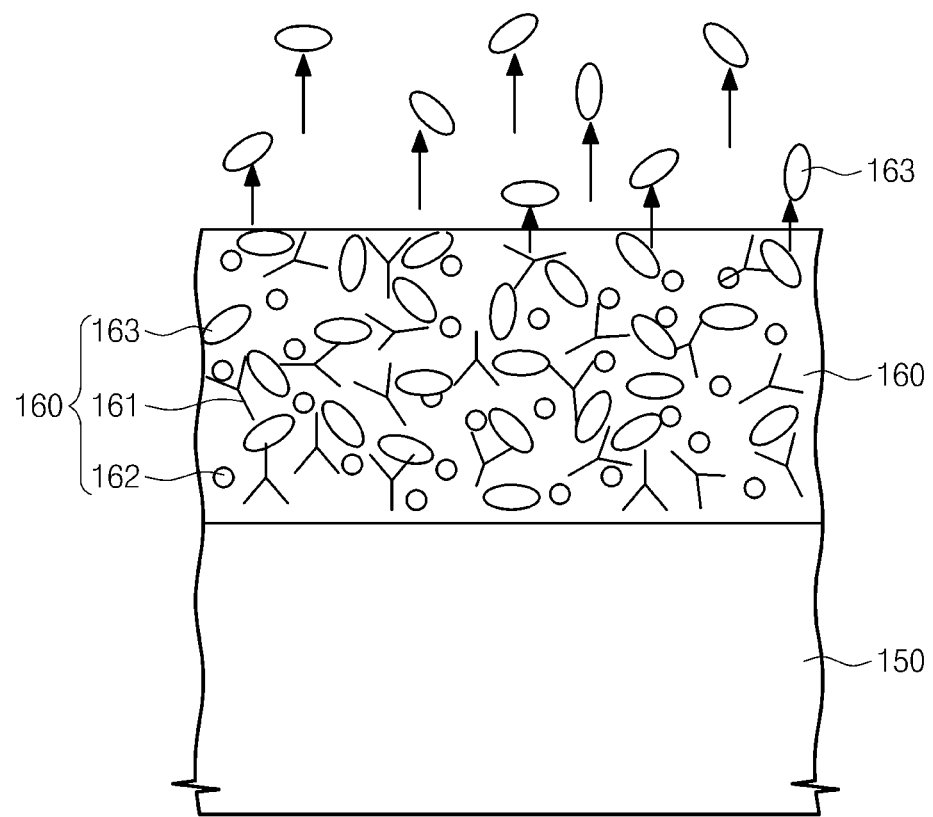

Referring to FIG. 5, after forming the hydrophobic insulating layer 160, a first heat process is performed on the hydrophobic insulating layer 160 to remove a portion of the solvent 163. The temperature of the first heat process depends on a boiling point of the solvent 163. For instance, the first heat process may be performed in a temperature range from the boiling point of the solvent 163 to a temperature higher than the boiling point by about 10 degrees or less. In detail, when the boiling point of the solvent 163 is about 70 degrees, the first heat process is performed in a temperature range of about 70 degrees to about 80 degrees. In addition, when the boiling point of the solvent 163 is about 100 degrees, the first heat process is performed in a temperature range of about 100 degrees to about 110 degrees. Further, when the solvent 163 is a mixture in which a plurality of solvents having boiling points which differ from each other are mixed and stirred, the first heat process may be performed a plurality of times.

In addition, the amount of the solvent 163, which is removed by the first heat process, is determined to be an amount which is sufficient to maintain the shape of the hydrophobic insulating layer 160. For example, the amount of the solvent 163 removed by the first heat process is about 1 wt % to about 99 wt % of the total amount of the solvent 163 contained in the first mixture. Thus, after performing the first heat process, the residual amount of the solvent 163 in the hydrophobic insulating layer 160 is about 1 wt % to about 99 wt % of the total amount of the solvent 163 contained in the first mixture.

Figure 6:
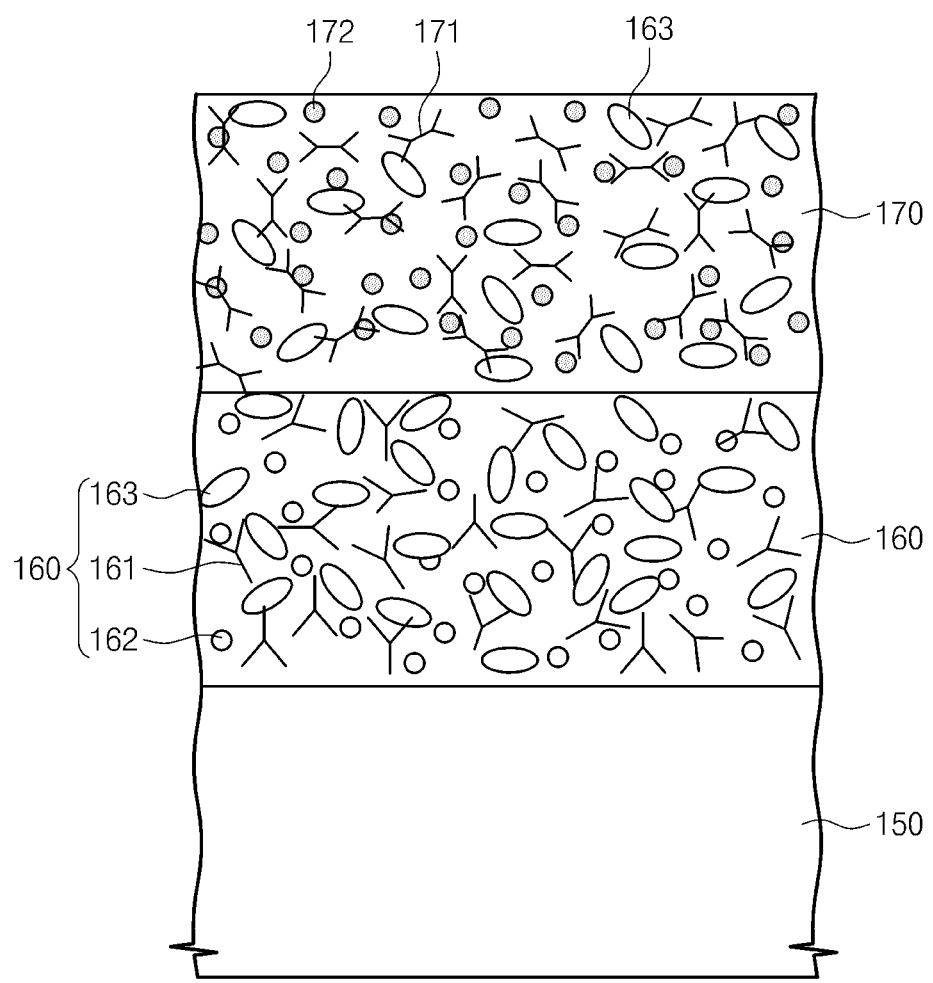

Referring to FIG. 6, after performing the first heat process, a second mixture including a material used to form the barrier wall 170 and the solvent 163 used to dissolve the hydrophobic material is coated on the hydrophobic insulating layer 160 and patterned so as to form the barrier wall 170. As an example, the material for the barrier wall 170 may include a photosensitive resin 171 and an additive 172.

The solvent 163 contained in the material for the barrier wall is about 10 wt % or less of the total amount of the second mixture that contains the material for the barrier wall 170 and the solvent 163.

When the material for the barrier wall includes the same solvent 163 as that of the hydrophobic insulating layer 160, the adhesive force between the hydrophobic insulating layer 160 and the barrier wall 170 may be improved. This is because solderability and wettability are improved at the boundary between the hydrophobic insulating layer 160 and the barrier wall 170 by the solvent 163 when the material for the barrier wall 170 is coated.

Figure 7:
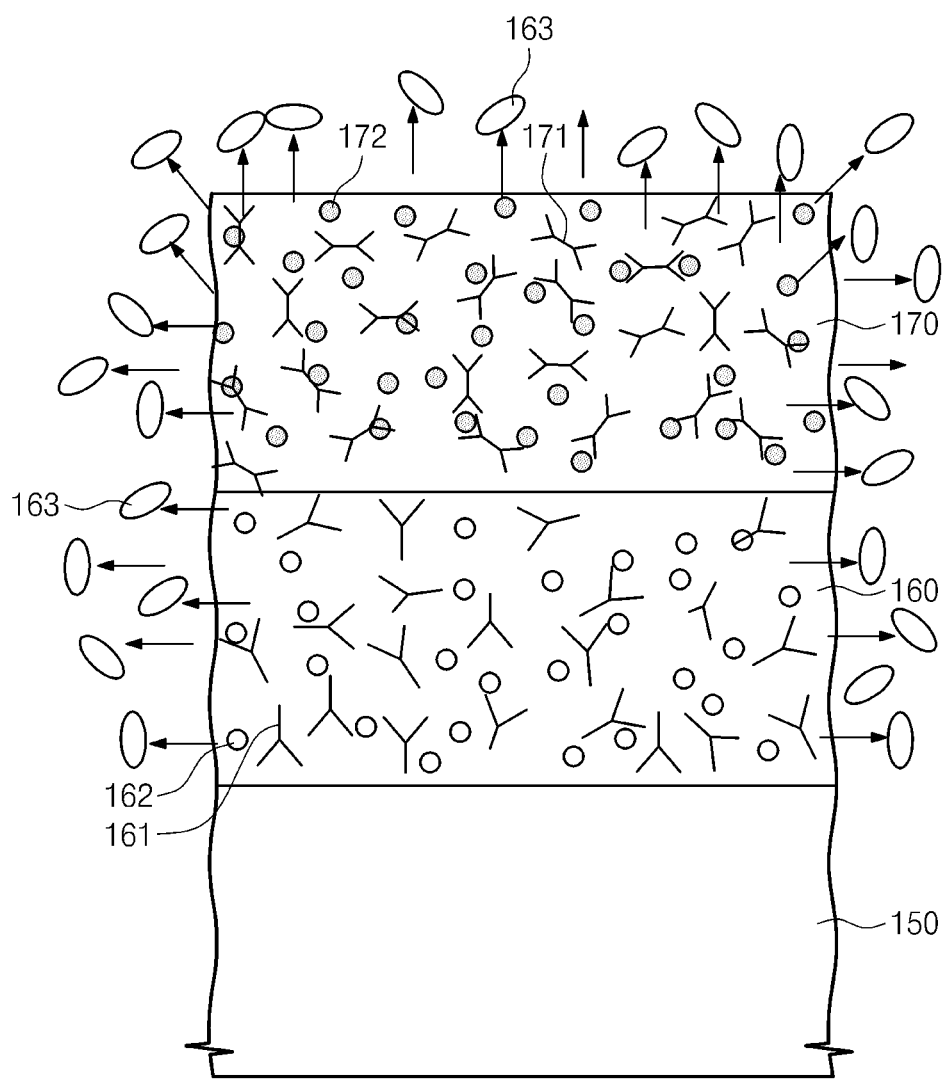

Referring to FIG. 7, after forming the barrier wall 170, a second heat process is performed to remove the residual solvent 163 in the hydrophobic insulating layer 160 and the barrier wall 170. In this case, the second heat process is performed so as to prevent the deformation of the hydrophobic insulating layer 160 and the barrier wall 170.

As shown in FIG. 3, the electrowetting layer 300 is formed after performing the second heat process. The electrowetting layer 300 includes the first fluid 310 accommodated in each pixel area and the second fluid 320 covering the array substrate 100 on which the barrier wall 170 is formed. The first fluid 310 is a non-polar fluid and the second fluid 320 is a polar fluid. In this case, the first fluid 310 may be oil including black dye or a light absorbing material to serve as the light shutter that blocks or transmits the light. The first fluid 310 is accommodated in each pixel area surrounded by the barrier wall 170. In addition, the second fluid 320 may be water or an aqueous solution. The second fluid 320 is accommodated in each pixel area or covers the pixel areas.

After the electrowetting layer 300 is formed, the array substrate 100 and the opposite substrate 200 are coupled to each other and sealed. The opposite substrate 200 includes the second base substrate 201 and the common electrode 210 formed on the second base substrate 201.

According to the above, the adhesive force between the hydrophobic insulating layer and the barrier wall may be improved. In addition, the electrowetting display apparatus, which has the improved adhesive force between the hydrophobic insulating layer and the barrier wall, may be manufactured.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electrowetting display apparatus comprising:
a first substrate comprising a base substrate comprising a plurality of pixel areas, a plurality of pixel electrodes spaced apart from each other and respectively disposed in the plurality of pixel areas, and a hydrophobic insulating layer disposed on the plurality of pixel electrodes, wherein the hydrophobic insulating layer comprises a hydrophobic organic resin and a hydrophobic inorganic particle;
a solvent disposed with the hydrophobic insulating layer, wherein the solvent is capable of at least partially dissolving the hydrophobic insulating layer at temperatures at or above a boiling point of the solvent;
a second substrate facing the first substrate and comprising a common electrode;
an electrowetting layer disposed between the first substrate and the second substrate and comprising a first fluid and a second fluid; and
a barrier wall disposed between the plurality of pixel areas and on the hydrophobic insulating layer, wherein the barrier wall comprises a photosensitive resin and an additive.

2. The electrowetting display apparatus of claim 1, wherein the barrier wall surrounds the plurality of pixel areas.

3. The electrowetting display apparatus of claim 1, wherein the hydrophobic organic resin comprises at least one of a fluoropolymer, a poly(p-xylylene) polymer, a polypropylene-based resin, and a siloxane-based resin.

4. The electrowetting display apparatus of claim 1, wherein the hydrophobic inorganic particle comprises at least one of $SiO_2$, $Al_2O_3$, ZnO, $TiO_2$, and BST.

5. The electrowetting display apparatus of claim 1, wherein the pixel electrode comprises a first conductive layer and a second conductive layer disposed on the first conductive layer, the first conductive layer comprising one of a transparent conductive oxide and a metal, and the second conductive layer comprising the other one of the transparent conductive oxide and the metal.

6. A method of manufacturing an electrowetting display apparatus, comprising:
forming a pixel electrode on a substrate comprising pixel areas, the pixel electrode being formed in individual ones of the pixel areas;
disposing a first mixture comprising a hydrophobic material and a solvent on the substrate to form a hydrophobic insulating layer;
performing a first heat process on the hydrophobic insulating layer;
disposing a second mixture comprising a material for a barrier and the solvent on the hydrophobic insulating layer;
patterning the second mixture to form a barrier wall surrounding the pixel electrodes in individual ones of the pixel areas;
performing a second heat process; and
disposing a first fluid and a second fluid on the pixel electrode to form an electrowetting layer.

7. The method of claim 6, wherein the first heat process is performed in a temperature range from a boiling point of the solvent to a temperature higher than the boiling point by about 10 degrees or less.

8. The method of claim 6, wherein after performing the first heat process, a residual amount of the solvent in the hydrophobic insulating layer is about 1 wt % to about 99 wt % of a total amount of the solvent contained in the first mixture.

9. The method of claim 6, wherein the hydrophobic material comprises a hydrophobic organic resin and a hydrophobic inorganic particle.

10. The method of claim 9, wherein the hydrophobic organic resin comprises at least one of a fluoropolymer, a poly(p-xylylene) polymer, a polypropylene-based resin, and a siloxane-based resin.

11. The method of claim 9, wherein the hydrophobic inorganic particle comprises at least one of $SiO_2$, $Al_2O_3$, ZnO, $TiO_2$, and BST.

12. The method of claim 6, wherein the solvent comprises an organic solvent.

13. The method of claim 12, wherein the solvent comprises a perflourinated solvent.

14. The method of claim 6, wherein the material for the barrier wall comprises a photosensitive resin and an additive.

15. The method of claim 14, wherein the solvent contained in the second mixture is about 10 wt % or less of a total amount of the second mixture.

16. The method of claim 6, wherein the pixel electrode comprises a first conductive layer and a second conductive layer disposed on the first conductive layer, the first conductive layer comprising one of a transparent conductive oxide and a metal material, and the second conductive layer comprising the other one of the transparent conductive oxide and the metal material.

17. The electrowetting display apparatus of claim 1, wherein the first fluid comprises a polar fluid and the second fluid comprises a non-polar fluid.

18. The method of claim 6, wherein the first fluid comprises a polar fluid and the second fluid comprises a non-polar fluid.

19. The method of claim 6, wherein the first heat process removes a portion of the solvent.

20. The method of claim 6, wherein the second heat process removes the solvent in the hydrophobic insulating layer and the barrier wall.

* * * * *